United States Patent [19]

Satake et al.

[11] Patent Number: 5,061,536
[45] Date of Patent: Oct. 29, 1991

[54] OPTICAL RECORDING MEDIUM

[75] Inventors: Toshimi Satake; Tomoaki Nagai; Hiroshi Fukui; Akio Sekine; Miyuki Yokoyama, all of Tokyo, Japan

[73] Assignee: Jujo Paper Co., Ltd., Tokyo, Japan

[21] Appl. No.: 474,936

[22] Filed: Feb. 5, 1990

[30] Foreign Application Priority Data

Feb. 6, 1989 [JP] Japan .................. 1-27186

[51] Int. Cl.$^5$ .............................................. B32B 3/02
[52] U.S. Cl. ...................................... 428/64; 428/65; 428/913; 428/76; 369/288; 346/76 L; 346/135.1; 430/945
[58] Field of Search .................... 428/64, 65, 913, 76; 369/288; 346/76 L, 135.1; 430/945

[56] References Cited

U.S. PATENT DOCUMENTS

| | | | |
|---|---|---|---|
| 4,075,018 | 2/1978 | Custer | 430/11 |
| 4,465,761 | 8/1984 | Takegawa et al. | 430/341 |
| 4,739,374 | 4/1988 | Mead et al. | 358/75 |
| 4,746,934 | 5/1988 | Schoening | 358/75 |
| 4,763,966 | 8/1988 | Suzuki et al. | 350/311 |
| 4,853,361 | 8/1989 | Satake et al. | 428/913 |
| 4,853,362 | 8/1989 | Satake et al. | 428/913 |
| 4,853,363 | 8/1989 | Satake et al. | 428/913 |
| 4,882,310 | 11/1989 | Arai et al. | 428/913 |
| 4,921,317 | 5/1990 | Suzuki et al. | 350/311 |
| 4,940,643 | 7/1990 | Sakai et al. | 430/108 |

Primary Examiner—Patrick J. Ryan
Assistant Examiner—Elizabeth Evans
Attorney, Agent, or Firm—Cushman, Darby & Cushman

[57] ABSTRACT

The present invention is related to an optical recording medium comprising a substrate, a light-absorbing layer containing a near infrared absorbent and a heat-sensitive color-developing layer, these layers being superposed upon the substrate. The near infrared absorbent which is used in the present invention is prepared by mixing and heating a thiourea derivative and a metallic compound. This near infrared absorbent has relatively uniform and strong absorption spectra all over the near infrared region, and therefore, on the optical recording medium of the present invention, an image having a high resolution can be directly obtained by the irradiation of the near infrared rays.

4 Claims, 1 Drawing Sheet

OPTICAL RECORDING MEDIUM

BACKGROUND OF THE INVENTION (i) Field of the Invention

The present invention relates to an optical recording medium on which recording is carried out by the irradiation of light in near infrared region.

(ii) Description of the Prior Art

A heat-sensitive recording system is a direct recording system which does not require any development and fixing, and therefore it is excellent in operation and maintenance. For this reason, the heat-sensitive recording system is widely utilized in facsimiles, printers and the like.

In this system, however, the recording is thermally made by bringing a thermal head or an exothermic IC pen into direct contact with a heat-sensitive recording paper, and hence melted colored substances adhere to the thermal head or the exothermic IC pen, so that troubles such as dregs adhesion and sticking take place, which brings about record obstruction and impairs record quality inconveniently.

In particular, when a line is depicted continuously in a recording direction as in the case of a plotter printer, it is impossible to avoid the trouble of the dregs adhesion.

Furthermore, when the recording is made by the thermal head, it is difficult to more heighten an image resolution of 8 dots/mm which is now employed Thus, as techniques by which troubles such as the dregs adhesion and the sticking are solved and by which the resolution is more improved, some non-contact recording systems using light have been suggested.

Japanese Patent Laid-open Publication No. 209594/1983 discloses an optical recording medium prepared by laminating at least one set of a near infrared absorbent layer having an absorption wave length in a near infrared region of 0.8 to 2 μm and a heat-sensitive color-developing material layer onto a substrate, and Japanese Patent Laid-open Publication No. 94494/1983 discloses a recording medium prepared by superposing, on a base material, a layer containing one or more kinds of heat-sensitive materials and a layer containing one or more kinds of near infrared absorbents comprising compounds having a maximum absorption wave length in near infrared rays of 0.7 to 3 μm.

These publications disclose the procedure of laminating or superposing the near infrared absorbent and the heat-sensitive color-developing material on the substrate or the base material That is, the near infrared absorbent is mixed with the heat-sensitive color-developing material and the resulting mixture is then applied onto the substrate or the base material, or alternatively the heat-sensitive color-developing material is first applied on the substrate or the base material, and the near infrared absorbent is then applied on the heat-sensitive color-developing material layer.

In the above-mentioned publications, there are disclosed dyestuffs such as cyanine dyestuffs, thiol nickel complexes and squalilium as the near infrared absorbent.

In addition, as enumerated in "Near Infrared Absorption Dyestuffs", Chemical Industry, Vol. 43, May 1986, other dyestuffs are known which are, for example, nitroso compounds and their metal complexes, polymethine dyestuffs (cyanine dyestuffs), complexes of thiols and cobalt or palladium, phthalocyanine dyestuffs, trialylmethane dyestuffs, immonium dyestuffs, diimmonium dyestuffs and naphthoquinone dyestuffs.

When these conventional near infrared absorbent and heat-sensitive color-developing material are mixed and then applied on the substrate as disclosed in the above-mentioned publication, a desensitization phenomenon appears and a color development performance deteriorates. Furthermore, when the heat-sensitive color-developing material is first applied on the substrate, and the near infrared absorbent is then applied on this material layer, the deterioration in a ground color occurs inconveniently. In addition, all the conventional near infrared absorbents have relatively strong and wide absorption spectra in a visual region, and they are also intensively colored. Therefore, it is difficult to obtain the optical recording medium having a white ground color, which obstructs putting the optical recording medium into practice.

SUMMARY OF THE INVENTION

An object of the present invention is to provide an optical recording medium in which a ground color and a color development performance are improved.

This object of the present invention can be achieved by providing an optical recording medium which comprises a substrate, a light-absorbing layer containing a near infrared absorbent, and a heat-sensitive color-developing layer, these layers being superposed upon the substrate, the aforesaid near infrared absorbent being prepared by heating a mixture of a thiourea derivative and a metallic compound.

Figure 1:
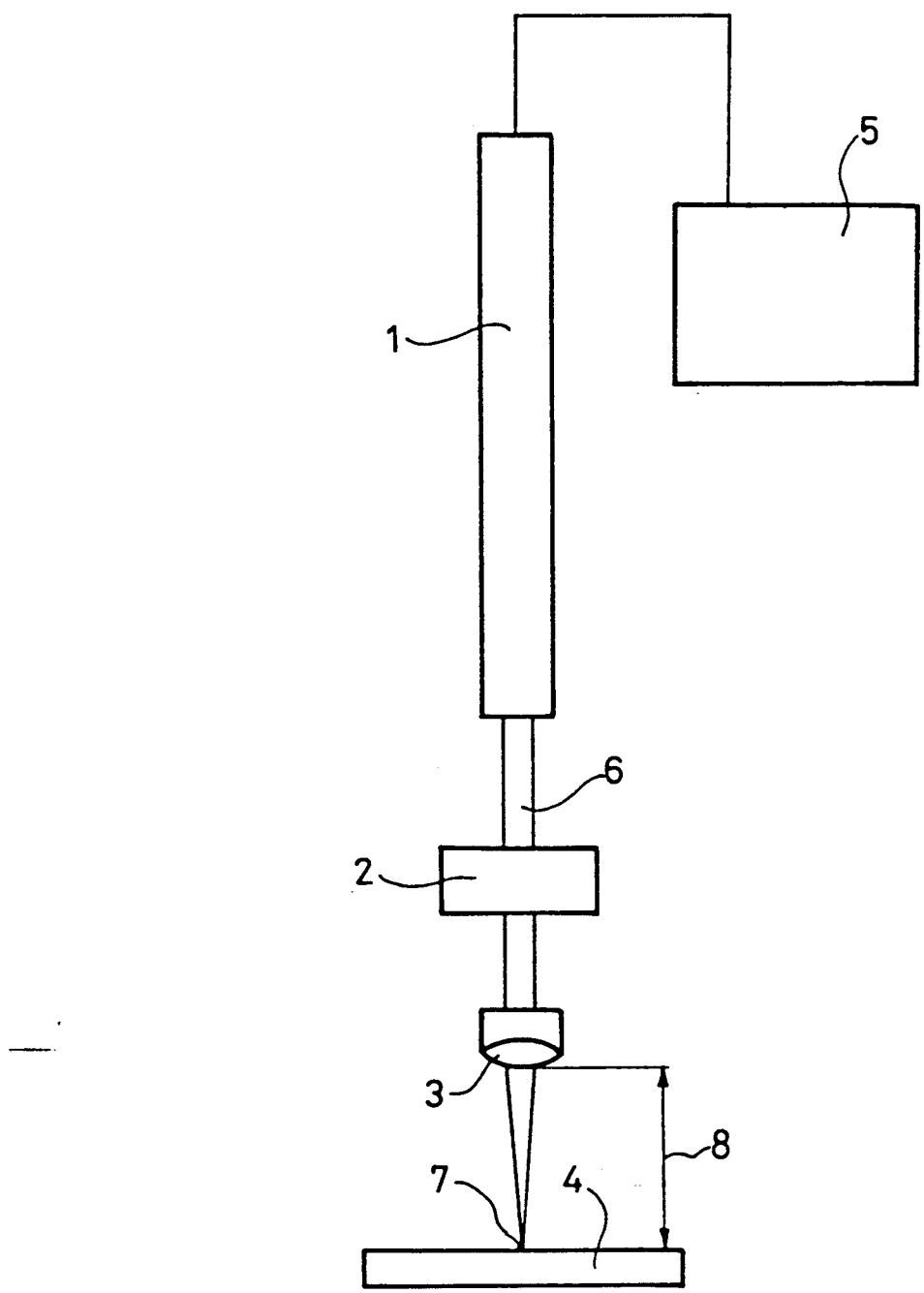
FIG. 1 is a block diagram of an optical recording device which is used when an optical recording medium of the present invention is irradiated with a laser beam.

1: Laser diode collimator head
2: Shutter
3: Condenser
4: Optical recording paper
5: Power source
6: Paralleled laser beam
7: Condensed point
8: Operation distance

DETAILED DESCRIPTION OF THE INVENTION

The present invention is directed to an optical recording medium which comprises a substrate, a light-absorbing layer containing a near infrared absorbent, and a heat-sensitive color-developing layer containing a basic colorless dye and an organic developer, these layers being superposed upon the substrate, the aforesaid near infrared absorbent being prepared by heating a mixture of a thiourea derivative represented by the formula (I)

wherein each of $R_1$, $R_2$ and $R_3$ is a monovalent group selected from the group consisting of hydrogen, an alkyl group, an alkenyl group, a cycloalkyl group, an aryl group, an aralkyl group and a five-membered or six-membered heterocyclic residue, a pair of $R_1$ and $R_2$ or a pair of $R_2$ and $R_3$ may be linked together to form a ring, and each group of $R_1$, $R_2$ and $R_3$ may have one or more substituents of an amino group, an alkyl group, an alkenyl group, an aryl group, an aralkyl group, a nitro group, a halogen atom, a hydroxyl group, an alkoxy group and an acyl group,
and a metallic compound represented by the formula (II)

$$(R-X)_n M \qquad (II)$$

wherein R is hydrogen, an alkyl group, a cycloalkyl group, an aryl group, an aralkyl group and a heterocyclic residue, each group of R may have one or more substituents, X is —COO, —SO$_4$, —SO$_3$, —PO$_4$ or —O, n is an integer of 1 to 4, and M is a metal having an atomic weight of 40 or more except metals in the group IA and IIA of the periodic table
or a metallic compound selected from the group of chlorophyll M, M chlorophyllin sodium and bisacetylacetonate M.

In particular, the light-absorbing layer containing the near infrared absorbent prepared by heating a copper compound and/or a lead compound and a thiourea derivative may be used as an underlayer, and the heat-sensitive color-developing layer containing the basic colorless dye and the organic developer may be superposed upon the above-mentioned layer, and in this case, a maximum effect can be obtained.

Moreover, a transparent protective layer may be disposed on the heat-sensitive color-developing layer, and a small amount of a conventional known near infrared absorbent dye may be contained in the protective layer or the underlayer, or on or under this layer, or alternatively a synthetic resin pigment having a high near infrared reflectivity is contained in the color-developing layer or the light-absorbing layer. According to this constitution, the more excellent optical recording medium can be obtained.

The feature of the present invention resides in that the optical recording medium comprises the light-absorbing layer containing the light absorbent and the heat-sensitive color-developing layer, and the light absorbent is the near infrared absorbent which can be prepared by heating the mixture of the thiourea derivative and the metallic compound.

This near infrared absorbent has relatively uniform and strong absorption spectra all over the near infrared region of 0.8 to 2.8 μm, and has relatively weak absorption spectra in a visible region. In addition, the near infrared absorbent can convert the absorbed near infrared rays into heat rapidly and effectively and then can release the heat. Therefore, this absorbent is suitable for the present invention.

The near infrared absorbent used in the present invention can be prepared by a method similar to that disclosed in Japanese Patent Application Nos. 145262/1988 and 232075/1988 filed by the same inventors of the present application regarding the near infrared absorption material which comprises the thiourea derivative and the copper compound or lead compound. That is, the near infrared absorbent used in the present invention can be prepared by mixing the thiourea derivative and the metallic compound, and then heating the resulting mixture. This preparation can be achieved by any of the following processes: A process in which the thiourea derivative is mixed with the metallic compound, and immediately the resulting mixture is then heated; a process in which both the materials are dispersed in a dispersant, and the resulting dispersion is then heated; a process in which each of the materials is separately dispersed in the dispersant, and the resulting dispersions are then mixed, followed by heating; and a process in which the dispersant is removed from the above-mentioned dispersion by drying or the like, and heating is then carried out. In each of these processes, the mixing and heating steps may be effected simultaneously.

Other materials which do not impair the near infrared absorbency of the absorbent, i.e., a binder, a dispersant, a dispersing medium and the like may be added to the mixture of the above-mentioned materials, if necessary.

In the heating treatment for generating the near infrared absorbency, any means can be used, so long as it can supply a thermal energy by which the two components are reacted to obtain a near infrared absorbing power. Examples of such a means include an electric heater, induction heating, melt molding of a film or the like, a thermal head, a semiconductor laser and an infrared lamp. The heating operation can be carried out under an optional atmosphere such as the atmosphere or an inert atmospheric gas, but usually under the atmosphere.

A heating temperature is usually in the range of 40° to 400° C., preferably 50° to 350° C. A heating time is usually in the range of milliseconds to tens minutes. Furthermore, it is preferred to add stirring, rotation or vibration so as to increase the contact frequency of the materials, to uniform the transmission of heat energy and to thereby accelerate the reaction, and to uniform a mixing state.

In the present invention, a blend ratio of the thiourea derivative to the metallic compound depends upon kinds of both materials themselves, but usually the amount of the thiourea compound is 0.01 to 50 parts, preferably 0.1 to 10 parts with respect to 1 part of the metallic compound.

Typical examples of the thiourea derivative of the formula (I) which is one of the constitutional components of the near infrared absorbent used in the present invention include 1,3-diphenylthiourea, 1,3-dibenzylthiourea, 1,3-dilaurylthiourea, 1,3-diethylthiourea, 1,3-dimethachlorothiourea, 1-(2-thiazolyl)-3-phenylthiourea, 1-benzyl-3-morpholinothiourea, and other compounds enumerated in Japanese Patent Application No. 145262/1988.

Typical examples of the metallic compound which is the other constitutional component of the near infrared absorbent in the present invention include organic acid salts, alkoxides and hydroxides of Y, Ti, Zr, V, Nb, Mn, Fe, Co, Ni, Pd, Cu, Ag, Zn, Sn and Pb.

Examples of the organic acid include the following compounds, but they are not limited.

Stearic acid, palmitic acid, oleic acid, behenic acid, lauric acid, capric acid, caproic acid, valeric acid, isobutyric acid, butyric acid, propionic acid, acetic acid, formic acid, benzoic acid, orthotoluic acid, metatoluic acid, paratoluic acid, paratertiary butylbenzoic acid, orthochlorobenzoic acid, methachlorobenzoic acid, parachlorobenzoic acid, dichlorobenzoic acid, trichlorobenzoic acid, p-bromobenzoic acid, p-iodobenzoic acid, p-phenylbenzoic acid, o-benzoylbezoic acid, p-nitrobenzoic acid, anthranyl acid, p-aminobenzoic acid, oxalic acid, malonic acid, succinic acid, glutaric acid, adipic acid, pimelic acid, suberic acid, azelaic acid, sebacic acid, phthalic acid, monoester phthalic acid, naphthenic acid, naphthalenecarboxylic acid, tartaric acid, diphenylamine-2-carboxylic acid, 4-cyclohexylbutyric acid, diethyldithiocarbamic acid, gluconic acid, octylic acid, alkylbenzenesulfonic acid, p-toluenesulfonic acid, naphthalinesulfonic acid, naphthylylaminesulfonic acid, n-dodecylbenzenesulfonic acid, dodecylsulfuric acid, 2,5-dimethylbenzenesulfonic acid, 2-carbomethoxy-5-methylbenzenesulfonic acid, α-naphtylphosphoric acid, stearylphosphoric acid, laurylphosphoric acid, di-2-ethylhexylphosphoric acid and isodecylphophoric acid.

Examples of the alcohol include alcohols corresponding to the above-mentioned organic acids.

Among others, the metallic compounds of V, Ni, Co, Fe, Ag, Cu and Pb are preferable as the near infrared absorbents, because they have uniform and intensive absorption spectra all over the near infrared region. In particular, the near infrared absorbent in which the copper compound or lead compound is used is more preferable, because when such a kind of absorbent is used, the light-absorbing layer having a white ground color can be obtained.

The absorbency of the near infrared rays depends upon kinds of the thiourea derivative and the metallic compound and can be optionally regulated by adjusting a ratio of the thiourea derivative to the metallic compound, the heating temperature, the heating time and the like.

The thus obtained near infrared absorbent has weak absorption spectra in the visible region, and therefore the absorption spectra in the near infrared portion of 1 μm or less are weaker than in the other portions. This tendency is noticeable, when a small amount of the near infrared absorbent in the present invention is used. On the other hand, most of the conventional known near infrared absorption dyestuffs have absorption peaks in the region of 1 μm or less. Accordingly, when the near infrared absorbent of the present invention and the known near infrared absorption dyestuff are used together by adjusting amounts of these absorbents, the functionally balanced light-absorbing layer can be formed which can absorb the near infrared rays uniformly in the wide region.

The thus obtained near infrared absorbent is mixed with and dispersed in the material constituting the light-absorbing layer, and the light-absorbing layer containing the absorbent is applied onto the substrate by means of spray, coating or printing. Alternatively, the preparation of the near infrared absorbent and the preparation of the light-absorbing layer may be carried out simultaneously by separately dispersing the thiourea compound or the metallic compound with the material constituting the light-absorbing layer to form slurries; mixing these slurries; applying the mixture on the substrate by means of spray, coating or printing; drying the applied material to remove a used dispersing medium therefrom; and heating the same.

The material of the substrate is not limited at all, but papers, synthetic papers and plastic films are usually used.

The material constituting the light-absorbing layer is composed of auxiliaries such as a binder, a white pigment and a near infrared absorption dyestuff.

The binder can be selected from conventional binders for the heat-sensitive color-developing layer which will be decribed.

The white pigment is effective to hide the color of the near infrared absorbent and to whiten the whole optical recording medium; and in addition, the pigment has functions of scattering the incident near infrared rays so as to increase the probability that the scattered near infrared rays hit against the near infrared absorbent, and to thereby heighten heat generation efficiency.

The white pigment works to reflect the visible rays intensively on the average, and usually it reflects the near infrared rays and visible rays similarly. Examples of the usable white pigment include clay, calcium bicarbonate, sedimentary calcium carbonate, titanium oxide, calcium sulfate, barium sulfate, zinc sulfate, satin white, talc, basic magnesium carbonate, zinc oxide, alumina, white carbon, silica gel, colloidal silica and plastic pigments. Preferable are white pigments having a porous state or a large specific surface area, such as silica gel, colloidal silica, ultrafine alumina and plastic pigments.

In particular, the hollow plastic pigments are preferable for the following reason: These hollow plastic pigments are excellent in reflection properties of the near infrared rays and insulating properties, and therefore they can inhibit the diffusion of the heat generated from the near infrared rays absorbed by the near infrared absorbent.

The near infrared absorption dyestuff which ensures the effect of the near infrared absorbent used in the present invention is relatively easily soluble in a solvent such as water, an alcohol and toluene, and its solubility is preferably 5% or more. Typical examples of such dyestuffs include polymethine dyestuffs (cyanine dyestuffs), azulenium dyestuffs, pyrylium dyestuffs and mercaptophenol dyestuffs which are mentioned as soluble near infrared absorbents in Japanese Patent Application No. 272702/1988 regarding an optical recording medium using a solvent-insoluble dispersible near infrared absorbent and filed by the same inventors as in the present application.

This near infrared absorption dyestuff can be contained in layers other than the heat-sensitive color-developing layer of the optical recording medium, i.e., in the light-absorbing layer and/or a protective layer or between these layers.

The thus obtained light-absorbing layer is superposed upon the heat-sensitive color-developing layer comprising a basic colorless dye, an organic developer and a binder, and if necessary, quality regulators such as a sensitizer and a filler, thereby obtaining the optical recording medium.

The heat-sensitive color-developing layer is all the same as a color-developing layer for a heat-sensitive recording paper containing a known electron-donating colorless dye and an electron-receiving organic developer by way of color development components, and all the known techniques regarding this color-developing layer for the heat-sensitive recording paper can be applied hereto.

Examples of the basic colorless dye include a triphenylmethane leuco dye such as crystal violet lactone, a fluoran leuco dye such as 3-diethylamino-6-methyl-7-anilinofluoran, an azaphthalide leuco dye such as 3-(4-diethylamino-2-ethoxyphenyl)-3-(1-ethyl-2-methylindole-3-yl)-4-azaphthalide and a fluorhein leuco dye such as 3,6,6'-tris(dimethylamino)spiro[fluorhein-9,3'-phthalide].

Furthermore, examples of the organic developer include bisphenol A's, 4-hydroxybenzoic acid esters, 4-hydroxyphthalic acid diesters, phthalic acid monoesters, bis(hydroxyphenyl) sulfides, 4-hydroxyphenylaryl sulfones, 4-hydroxyphenylarylsulfonates, 1,3-di[2-(hydroxyphenyl)-2-propyl]-benzenes, 4-hydroxybenzoyloxybenzoic acid esters and bisphenol sulfones.

Examples of the binder include completely saponified polyvinyl alcohol having a polymerization degree of 200 to 1900, a modified polyvinyl alcohol such as amide-modified polyvinyl alcohol, hydroxyethyl cellulose and styrenebutadiene copolymer.

Usually, fatty amide, montan wax and the like can be used as sensitizers or quality regulators, and clay, calcium carbonate, plastic pigments and the like which are generally used in the paper coating field can also be used as fillers. In particular, the hollow plastic pigments are preferable because of excellent reflecting properties to the near infrared rays and because of good heat retaining properties.

As these materials used in the heat-sensitive color-developing layer, basic colorless dyes, organic developers, binders, sensitizers, fillers and quality regulators mentioned in Japanese Patent Application No. 272702/1988 filed by the same inventors of the present application can also be used in the present invention.

Kinds and amounts of the organic developer, the basic colorless dye, the binder, the sensitizer, the filler and other components in the color-developing layer used in the present invention depend upon desired performance and recording properties, and they are not particularly limited. Usually, the suitable amount of the organic developer is from 3 to 12 parts (weight parts of the solid), that of the sensitizer is from 3 to 12 parts, that of the filler is 1 to 20 parts with respect to 1 part of the basic colorless dye, and the suitable amount of the binder is from 10 to 25 parts of the whole solids in the color-developing layer.

The organic developer, the basic colorless dye and the sensitizer are ground separately or, if necessary and if accepted, together with materials to be added, by means of a mill such as a ball mill, an attritor, a sand grinder or a suitable emulsifier until the particle diameter of each component has been at a level of microns or less. Afterward, the binder and, when desired, various quality regulators are further added thereto in order to prepare a coating solution.

The thus obtained coating solution is applied onto the substrate or the optical recording layer, thereby preparing the heat-sensitive color-developing layer.

When the heat-sensitive color-developing layer is superposed upon the optical recording layer, the color of the optical recording layer is further hidden, so that the optical recording medium having a preferable appearance is prepared.

It is a preferable way to dispose a protective layer on the surface of the heat-sensitive color-developing layer so as to diminish or inhibit the contamination by moisture, gases, water, solvents, oily substances and the like.

The protective layer must be permeable to the visible rays and must not have a bad influence on the heat-sensitive color-developing layer. Usually, the protective layer is formed by coating with one or more selected from the binders which are used in the heat-sensitive color-developing layer. When the soluble near infrared absorbent is contained in the protective layer or between the protective layer and the heat-sensitive color-developing layer, the sensitivity of the optical recording medium can be further heightened.

A light source necessary in an optical recording operation must contain a wave length in the near infrared region of 0.7 to 2.5 μm, and examples of such a light source include a semiconductor laser, a diode pumping YAG laser, a Xe flashlamp, a quartz flashlamp and a halogen lamp, from which preferable one can be selected in compliance with its use purpose.

As discussed above, recording is performed by irradiating, with the near infrared rays, the optical recording medium of the present invention which comprises the substrate, the light-absorbing layer containing the near infrared absorbent prepared by mixing and heating the thiourea derivative and the metallic compound, the heat-sensitive color-developing layer containing the basic colorless dye and the organic developer, these layers being superposed upon the substrate.

The near infrared absorbent in the light-absorbing layer absorbs the near infrared rays of any wave length contained in the irradiation light and converts into heat effectively. The generated heat rapidly transfers to the heat-sensitive color-developing layer which lies on or under the light-absorbing layer, and then causes a reaction between the basic colorless dye and the organic developer in the heat-sensitive color-developing layer. An image can be recorded on the optical recording medium simultaneously with the irradiation of the light.

Since the near infrared absorbent has weak absorption spectra in the visible region, the ground color of the light-absorbing layer is good. In particular, when the light-absorbing layer is disposed under the heat-sensitive color-developing layer, the ground color is better, and in addition, the near infrared absorbent is separated from the heat-sensitive color-developing layer, so that any desensitization does not occur in the color-developing layer.

Now, the present invention will be described in detail in reference to examples, but the scope of the present invention should not be limited to these examples. In the examples, parts and percent are by weight.

Optical recording papers in the undermentioned examples and comparative examples were evaluated in points of image density and ground color. Measurements were carried out as follows, and the results are set forth in Table 1.

Density of developed color: An image density was measured with a Macbeth densitometer by a light irradiation.

Ground color: A white paper portion was measured by means of a Macbeth densitometer.

EXAMPLES 1 TO 21

[Light-absorbing layer]

Each of a thiourea derivative and a metallic compound shown in Table 1 was used in the form of the following composition.

| Solution A | |
|---|---|
| Thiourea derivative | 50 parts |
| 10% Aqueous polyvinyl alcohol solution | 25 parts |
| Water | 125 parts |
| Total | 200 parts |
| Solution B | |
| Metallic compound | 50 parts |
| 10% Aqueous polyvinyl alcohol solution | 25 parts |
| Water | 125 parts |
| Total | 200 parts |

Each solution of the above-mentioned composition was wet-ground by an attritor until the average particle diameter of each component was about 3 μm.

A filler was used in the form of the following dispersion, i.e., solution C.

| Solution C: Filler-containing slurry | |
|---|---|
| Silica | 40 parts |
| Water | 60 parts |
| Total | 100 parts |

Silica was dispersed in the solution C by a stirrer.

The solution A (thiourea derivative dispersion) was mixed with the solution B (metallic compound dispersion) in each blend ratio shown in Table 1, and the mixture was then added to a filler-containing slurry prepared by adding 100 parts of a 10% aqueous polyvinyl alcohol solution to 250 parts of the solution C, the amount of the mixture being described in the column of "amount of composition for near infrared absorption" in Table 1, whereby a light-absorbing layer coating solution was prepared.

A fine paper having a basis weight of 60 g/m² was coated with the thus prepared light-absorbing layer coating solution by the use of a meyer bar so that a coating weight might be 5 g/m². After drying, a heat treatment was then carried out at 150° C. to obtain a heat conversion under sheet having the light-absorbing layer.

[Heat-sensitive color-developing layer]

| Solution E (basic colorless dye dispersion) | |
|---|---|
| Basic colorless dye shown in Table 1 | 2.0 parts |
| 10% Aqueous polyvinyl alcohol solution | 3.4 parts |
| Water | 1.27 parts |
| Total | 6.67 parts |

In Table 1, ODB, S-205 and ODB-2 in the column of "Dye" are indicative of the following compounds:
ODB: 3-Diethylamino-6-methyl-7-anilinofluoran
S-205: 3-(N-ethyl-N-isoamylamino)-6-methyl-7-anilinofluoran
ODB-2: Dibutylamino-6-methyl-7-anilinofluoran

| Solution F (developer dispersion) | |
|---|---|
| Developer shown in Table 1 | 6.0 parts |
| P-Benzylbiphenyl | 4.0 parts |
| 10% Aqueous polyvinyl alcohol solution | 12.5 parts |
| Water | 2.5 parts |
| Total | 25.0 parts |

In Table 1, BPA, BPS and POB in the column of "Developer" are indicative of the following compounds:
BPA: Bisphenol A
BPS: Bisphenol S
POB: p-Hydroxybenzoic acid benzyl ester Solutions E and F having the above-mentioned compositions were separately wet-ground for 1 hour by a sand grinder for tests.

Next, 6.67 parts of the solution E (dye dispersion), 25 parts of the solution F (developer dispersion) and 11.76 parts of a 42.5% hollow pigment (trade name ROPAQUE OP-48J; made by Rohm & Haas Co.) were mixed in order to prepare a heat-sensitive color-developing coating solution.

The light-absorbing heat conversion under sheet was then coated with this coating solution by the use of a meyer bar so that a coating weight might be 3.0 g/m², followed by drying, in order to obtain an optical recording paper.

(Protective layer)

| 10% Aqueous polyvinyl alcohol solution | 100 parts |
|---|---|
| Glyoxal (40%) | 5 parts |
| Total | 105 parts |

The above-mentioned optical recording paper was coated with this protective layer coating solution by the use of a meyer bar so that a coating weight might be 2 g/m², followed by drying, in order to obtain an optical recording paper with the protective layer.

COMPARATIVE EXAMPLES 1, 7, 8 AND 9

Each fine paper having a basis weight of 60 g/m² was coated with a filler-containing slurry prepared by mixing 250 parts of the solution C used in Examples 1 to 21 with 100 parts of a 10% aqueous polyvinyl alcohol solution by the use of a meyer bar so that a coating weight might be 5 g/m², followed by drying. Next, a heat treatment was carried out at 150° C. in order to obtain a filler-containing sheet containing no near infrared absorbent. This sheet was then coated with a coating material in which the dye and developer in Table 1 were blended as in Examples 1 to 21, by the use of a meyer bar so that a coating weight might be 3.0 g/m², followed by drying, in order to obtain recording papers of Comparative Examples 1, 7, 8 and 9.

COMPARATIVE EXAMPLES 2, 3, 4, 5, 6 AND 10

Solutions A and B were prepared from thiourea derivatives or metallic compounds of Comparative Examples 2, 3, 4 and 5 in Table 1 in the same manner as in Example 1. Then, 20 parts of each of the solutions A and B was mixed with the filler-containing slurry used in Comparative Example 1 in order to form an undercoating solution. A fine paper having a basis weight of 60 g/m² was coated with this undercoating solution by a meyer bar so that a coating weight might be 5 g/m², followed by drying. A heat treatment was then carried out at 150° C. in order to obtain under sheets of Comparative Examples 2, 3, 4 and 5 containing only one component of the near infrared absorbent. Each sheet was then coated with a coating material in which ODB and BPA were blended as a dye and developer by the same procedure as in Examples 1 to 21, by the use of a meyer bar so that a coating weight might be 3.0 g/m², followed by drying, in order to obtain recording papers of Comparative Examples 2, 3, 4 and 5.

ODB and BPA were used as a dye and a developer in the same manner as in Examples 1 to 21 in order to form a heat-sensitive color-developing coating material. The thus prepared heat-sensitive color-developing coating material was then mixed with 20 parts of 1,3-diphenylthiourea dispersion formed by the same procedure as in the case of the solution A in Examples 1 to 21. The filler-containing sheet obtained in Comparative Example 1 was then coated with the resulting mixture, followed by drying, whereby a recording paper having the heat-sensitive color-developing layer regarding Comparative Example 6 was obtained.

The heat-sensitive color-developing layer of this recording paper regarding Comparative Example 1 was coated with a coating material which had been prepared by mixing 20 parts of 1,3-diphenylthiourea dispersion formed in the same manner as in the case of the solution A of Examples 1 to 21 with 105 parts of the protective layer coating solution used in Examples 1 to 21, by the use of a meyer bar so that a coating weight might be 2.0 g/m², followed by drying, in order to obtain a recording paper of Comparative Example 10.

The optical recording mediums thus obtained in Examples 1 to 12 and Comparative Examples 1 to 10 were then irradiated with light from a strobo flash Auto 433D (made by Sun Pack Co., Ltd.) for cameras under conditions that an emission window was stopped to 5% in order to perform recording.

As is apparent from Table 1, in the comparative examples regarding the optical recording mediums which do not contain the near infrared absorbent used in the present invention or which comprise the under layer containing either of the thiourea compound or the metallic compound and the heat-sensitive color-developing layer, any color is not developed at all, when irradiated with the light. On the contrary, with regard to the optical recording papers of the examples in which the heat-sensitive color-developing layer is superposed upon the light-absorbing layer containing the near infrared absorbent of the present invention obtained by mixing and then heating the thiourea derivative and the metallic compound, a high image density and a white ground color can be obtained, and therefore the optical recording papers of the present invention are practical.

Furthermore, the optical recording medium in which the protective layer is superposed upon the heat-sensitive color-developing layer is substantially equal in the image density and the ground color to the other medium in which no protective layer is disposed. When the surface of the optical recording medium having the protective layer was rubbed with a wet finger of a man, it did not peel off, which means that the optical recording medium of the present invention is excellent against water resistance and wear resistance.

TABLE 1

| | Protective Layer | Amount of Composition for Near Infrared Absorption | Light-absorbing Layer Thiourea Derivative (I) |
|---|---|---|---|
| Example 1 | Absent | 20 (parts) | 1,3-diphenylthiourea |
| Example 2 | Absent | 20 | 1,3-diphenylthiourea |
| Example 3 | Absent | 20 | 1,3-diphenylthiourea |
| Example 4 | Present | 20 | 1,3-diphenylthiourea |
| Example 5 | Absent | 20 | 1,3-diphenylthiourea |
| Example 6 | Absent | 20 | 1,3-diphenylthiourea |
| Example 7 | Absent | 20 | 1,3-diphenylthiourea |
| Example 8 | Absent | 20 | di-m-chlorophenylthiourea |
| Example 9 | Absent | 20 | di-m-chlorophenylthiourea |
| Example 10 | Absent | 20 | 1,3-diphenylthiourea |
| Example 11 | Absent | 20 | 1,3-diphenylthiourea |
| Example 12 | Absent | 20 | 1,3-distearylthioure |
| Example 13 | Absent | 20 | 1,3-distearylthiourea |
| Example 14 | Absent | 20 | 1,3-diphenylthiourea |
| Example 15 | Absent | 20 | 1,3-dibenzylthiourea |
| Example 16 | Absent | 20 | 1,3-dibenzylthiourea |
| Example 17 | Absent | 15 (parts) | 1,3-diphenylthiourea |
| Example 18 | Absent | 30 | 1,3-diphenylthiourea |
| Example 19 | Absent | 50 | 1,3-diphenylthiourea |
| Example 20 | Absent | 20 | 1-benzyl-3-morpholino-thiourea |
| Example 21 | Absent | 20 | 1,3-diphenylthiourea |
| Comp. Ex. 1 | Absent | 0 | — |
| Comp. Ex. 2 | Absent | 20 | 1,3-diphenylthiourea |
| Comp. Ex. 3 | Absent | 20 | — |
| Comp. Ex. 4 | Absent | 20 | di-m-chlorophenylthiourea |
| Comp. Ex. 5 | Absent | 20 | — |
| Comp. Ex. 6 | Absent | 20 | 1,3-distearylthiourea |
| Comp. Ex. 7 | Absent | 0 | — |
| Comp. Ex. 8 | Absent | 0 | — |
| Comp. Ex. 9 | Absent | 0 | — |
| Comp. Ex. 10 | Present | 20 | 1,3-diphenylthiourea |

| | Light-absorbing Layer Metallic Compound (II) | (I):(II) | Layer* Developer | Dye | Evaluation Color Density | Ground Color |
|---|---|---|---|---|---|---|
| Example 1 | copper p-chlorobenzoate | 5:1 | BPA | ODB | 1.35 | 0.12 |
| Example 2 | lead p-chlorobenzoate | 5:1 | BPA | ODB | 1.34 | 0.13 |
| Example 3 | copper p-chlorobenzoate | 1:1 | BPA | ODB | 1.35 | 0.16 |
| Example 4 | copper p-chlorobenzoate | 1:1 | BPA | S-205 | 1.32 | 0.13 |
| Example 5 | copper stearate | 5:1 | BPA | ODB | 1.32 | 0.14 |
| Example 6 | copper p-chlorobenzoate | 5:1 | POB | ODB | 1.32 | 0.12 |
| Example 7 | lead p-chlorobenzoate | 5:1 | POB | ODB | 1.32 | 0.13 |
| Example 8 | copper p-chlorobenzoate | 5:1 | BPS | ODB | 1.20 | 0.14 |
| Example 9 | lead p-chlorobenzoate | 5:1 | BPS | ODB | 1.19 | 0.15 |
| Example 10 | copper hydroxide | 5:1 | BPA | ODB | 1.40 | 0.12 |
| Example 11 | lead hydroxide | 5:1 | BPA | ODB | 1.32 | 0.13 |
| Example 12 | copper hydroxide | 5:1 | BPA | ODB-2 | 1.34 | 0.13 |
| Example 13 | lead hydroxide | 5:1 | BPA | ODB | 1.21 | 0.12 |
| Example 14 | copper hydroxide | 5:1 | POB | ODB | 1.33 | 0.13 |
| Example 15 | copper benzoate | 5:1 | BPA | ODB | 1.34 | 0.14 |
| Example 16 | lead benzoate | 5:1 | BPA | ODB | 1.32 | 0.13 |

TABLE 1-continued

| | | | | | | |
|---|---|---|---|---|---|---|
| Example 17 | copper p-chlorobenzoate | 5:1 | BPA | ODB | 1.05 | 0.11 |
| Example 18 | copper p-chlorobenzoate | 5:1 | BPA | ODB | 1.35 | 0.14 |
| Example 19 | copper p-chlorobenzoate | 5:1 | BPA | ODB | 1.40 | 0.23 |
| Example 20 | copper p-chlorobenzoate | 5:1 | BPA | ODB | 1.35 | 0.13 |
| Example 21 | cobalt hydroxide | 5:1 | BPA | ODB | 1.35 | 0.15 |
| Comp. Ex. 1 | — | 0:0 | BPA | ODB | 0.07 | 0.08 |
| Comp. Ex. 2 | — | 100:0 | BPA | ODB | 0.07 | 0.07 |
| Comp. Ex. 3 | copper p-chlorobenzoate | 0:100 | BPA | ODB | 0.09 | 0.09 |
| Comp. Ex. 4 | — | 100:0 | BPA | ODB | 0.07 | 0.07 |
| Comp. Ex. 5 | lead p-chlorobenzoate | 0:100 | BPA | ODB | 0.10 | 0.10 |
| Comp. Ex. 6 | — | 100:0 | BPA | ODB | 0.07 | 0.07 |
| Comp. Ex. 7 | — | 0:0 | BPS | ODB | 0.09 | 0.09 |
| Comp. Ex. 8 | — | 0:0 | POB | ODB | 0.06 | 0.06 |
| Comp. Ex. 9 | — | 0:0 | BPA | S-205 | 0.07 | 0.07 |
| Comp. Ex. 10 | — | 100:0 | BPA | ODB | 0.09 | 0.09 |

*Layer: Heat-sensitive color-developing layer

EXAMPLE 22

Optical recording was carried out by irradiating the optical recording paper obtained in Example 1 with a laser beam by the use of a device shown in FIG. 1 in which a semiconductor laser head (laser diode collimator head LDC-8330-CINC; made by Applied Optic Co., Ltd., central wave length 830 nm, output 30 nW) was used as a light source and a condenser (MDPLAN 5 made by Olympus Optical Co., Ltd., 0.1) was also used. An irradiation time was 1/500 second. A colored spot was measured by the use of a densitometer (PDM-5 made by Konishiroku Photo Industry Co., Ltd.), and the measured value was converted into a Macbeth density, whereby it was definite that the colored spot was an extremely black color image having a Macbeth density of 1.35. On the contrary, when the optical recording papers of Comparative Examples 1 to 10 were irradiated with the laser beam under the same conditions, any image was not recorded at all. Thus, the irradiation was further made for 10 minutes, but any color was not developed at all.

EXAMPLE 23

Optical recording was carried out by irradiating the optical recording paper obtained in Example 1 with a laser beam for 1 second by the use of a device shown in FIG. 1 in which an He-Ne laser head (Model 105-1 made by Spectra Physics Co., Ltd., central wave length 632.8 nm, output 5 mW) was used as a light source and a beam collimator (BC-5 made by Nippon Kagaku Engineering Co., Ltd.) was also used. A colored spot was measured by the use of a densitometer (PDM-5 made by Konishiroku Photo Industry Co., Ltd.), and the measured value was converted into a Macbeth density, whereby it was definite that the colored spot was a completely colored image having a Macbeth density of 1.33. On the contrary, when the optical recording papers of Comparative Examples 1 to 10 were irradiated with the laser beam under the same conditions, any image was not recorded at all. Thus, the recording papers were further irradiated for a long time of 10 minutes, but any color was not developed at all.

As discussed above, on the optical recording medium of the present invention, an image having a high resolution can be directly obtained by the irradiation of near infrared rays from a semiconductor laser or a strobo flash. When the near infrared absorbent of the present invention comprising a less colored thiourea derivative and a metallic compound is used, light sources such as a semiconductor laser having optional near infrared wave lengths and a strobo flash having continuous near infrared wave lengths can be utilized effectively. In consequence, the near infrared absorbent of the present invention has led to a successful result in putting a heat mode optical recording medium into practice.

What is claimed is:

1. An optical recording medium which comprises a substrate, a light-absorbing layer containing a near infrared absorbent, and a heat-sensitive color-developing layer containing a basic colorless dye and an organic developer, wherein said light-absorbing layer is superposed upon said substrate, and said heat-sensitive color-developing layer is superposed upon said light-absorbing layer in turn, said near infrared absorbent being prepared by heating a mixture of a thiourea derivative represented by the formula (I)

wherein each $R_1$, $R_2$ and $R_3$ is a monovalent group selected from the group consisting of hydrogen, an alkyl group, an alkenyl group, a cycloalkyl group, an aryl group, an aralkyl group and a five-membered or six-membered heterocyclic residue, a pair of $R_1$ and $R_2$ or a pair of $R_2$ and $R_3$ may be linked together to form a ring, and each group of $R_1$, $R_2$ and $R_3$ may have one or more substituents of an amino group, an alkyl group, an alkenyl group, an aryl group, an aralkyl group, a nitro group, a halogen atom, a hydroxyl group, an alkoxy group and acyl group, and a metallic compound represented by the formula (II)

wherein R is hydrogen, an alkyl group, a cycloalkyl group, an aryl group, an aralkyl group and a heterocyclic residue, each group of R may have one or more substituents, X is —COO, —SO$_4$, —SO$_3$, —PO$_4$ or —O, n is an integer of 1 to 4, M is a metal having an atomic weight of 40 or more except metals in the group IA and IIA of the periodic table or a metallic compound selected from the group of chlorophyll M, M chlorophyllin sodium and bisacetylacetonate M.

2. An optical recording medium according to claim 1 wherein a transparent protective layer is disposed on said heat-sensitive color-developing layer.

3. An optical recording medium according to any one of claims 1 to 2 wherein said metal of said metallic compound is cooper or lead.

4. An optical recording medium according to claim 1 wherein said metallic compound is copper hydroxide or lead hydroxide, and said thiourea derivative is diphenylthiourea.

* * * * *